United States Patent
Minagawa et al.

(10) Patent No.: US 7,155,548 B2
(45) Date of Patent: Dec. 26, 2006

(54) SEQUENTIAL DEVICE CONTROL WITH TIME-OUT FUNCTION

(75) Inventors: Yusuke Minagawa, Ibraki (JP); Yasutomo Matsuba, Ibaraki (JP); Satoru Yamauchi, Ibaraki (JP)

(73) Assignee: Texas Instruments Incorporated, Dallas, TX (US)

( * ) Notice: Subject to any disclaimer, the term of this patent is extended or adjusted under 35 U.S.C. 154(b) by 205 days.

(21) Appl. No.: 10/983,136

(22) Filed: Nov. 4, 2004

(65) Prior Publication Data
US 2005/0120143 A1 Jun. 2, 2005

Related U.S. Application Data

(60) Provisional application No. 60/517,613, filed on Nov. 4, 2003.

(51) Int. Cl.
*G06F 11/00* (2006.01)
*G06F 13/24* (2006.01)
(52) U.S. Cl. .................... 710/105; 710/36; 714/100
(58) Field of Classification Search .............. 710/8, 710/305; 711/112, 122, 147, 202; 713/600; 712/245; 714/758; 369/47.53, 30.23
See application file for complete search history.

(56) References Cited

U.S. PATENT DOCUMENTS 5,526,508 A * 6/1996 Park et al. ............... 711/122
5,701,450 A * 12/1997 Duncan ................... 712/245
5,715,418 A * 2/1998 Atsatt et al. .............. 711/202
6,157,966 A * 12/2000 Montgomery et al. ......... 710/8
6,683,825 B1* 1/2004 Sato ..................... 369/30.23
6,742,071 B1* 5/2004 Boynton et al. ........... 710/305
6,763,437 B1* 7/2004 Nguyen et al. ............ 711/147
6,931,582 B1* 8/2005 Tamura et al. ............ 714/758
6,950,960 B1* 9/2005 Mohammad ............... 713/600
7,023,774 B1* 4/2006 Hattori .................. 369/47.53
2003/0172229 A1* 9/2003 Takasugi et al. ........... 711/112

FOREIGN PATENT DOCUMENTS

JP 411328842 A * 11/1999

* cited by examiner

*Primary Examiner*—Christopher E. Lee
(74) *Attorney, Agent, or Firm*—Robert D. Marshall, Jr.; W. James Brady; Frederick J. Telecky, Jr.

(57) ABSTRACT

This invention is used in a real time system that includes a host processor, interface hardware and an external device controlled by the interface hardware. To maintain system real-time performance, handshake protocol between the external device and the interface hardware is automatic during command execution. This invention moves control of the external device to the host processor if a command doesn't finish before a host processor specified time limit. If command execution exceeds the time limit, the host processor controls the handshake protocols directly and sequentially. This prevents system breakdown caused by trouble at the external device.

5 Claims, 3 Drawing Sheets

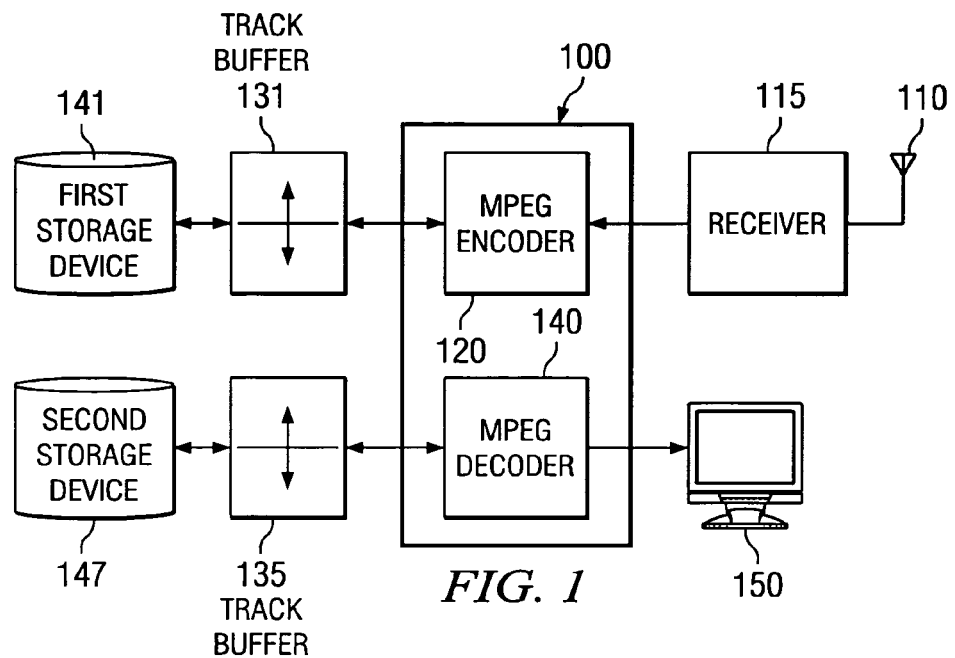
FIG. 1
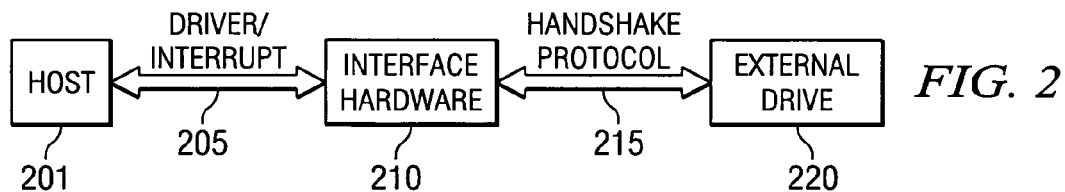
FIG. 2
FIG. 3
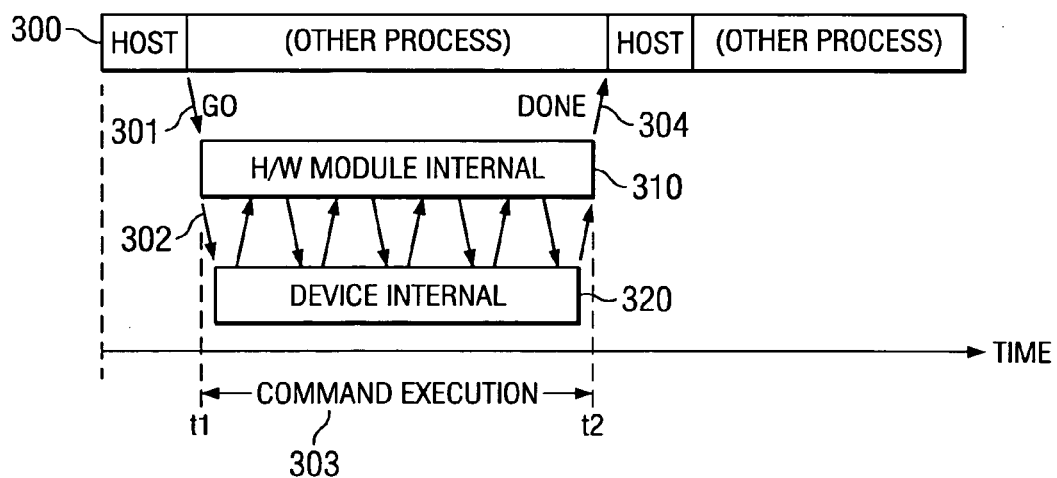

SEQUENTIAL DEVICE CONTROL WITH TIME-OUT FUNCTION

This application claims priority under 35 U.S.C. §119(e)(1) from U.S. Provisional Application No. 60/517,613 filed Nov. 4, 2003.

TECHNICAL FIELD OF THE INVENTION

The technical field of this invention is real time computer control of a remote device.

BACKGROUND OF THE INVENTION

This invention is applicable in a real time system including an external device, interface hardware that automatically controls handshake protocol with the external device and a host processor. In this real time system the external device control protocol is mainly handled by the interface hardware because high speed is needed to provide real-time performance. The interface hardware access is much faster than access by a software program driving the host processor. Thus the host processor is not effective for controlling the handshake protocol due to wait sequences for the external device.

This system may breakdown once the handshake protocol stops due to trouble with the external device. Once this breakdown occurs, it may take 10 to 20 seconds recover. Such system breakdown causes problems.

SUMMARY OF THE INVENTION

In systems employing this invention, control of the external device is moved from the interface hardware to the host processor when a command doesn't finish execution before a limit time. The host processor specifies this time limit. This invention employs time division multiplexing of the control of the external device between the interface hardware and the host processor. This invention is advantageous because it enables reduced size of the interface hardware and avoids system breakdown.

BRIEF DESCRIPTION OF THE DRAWINGS

These and other aspects of this invention are illustrated in the drawings, in which:

FIG. 1 illustrates a block diagram of a video system to which this invention is applicable;

FIG. 2 illustrates a block diagram of a system employing this invention;

FIG. 3 illustrates the control sequence for the external device during normal operation according to the prior art;

DETAILED DESCRIPTION OF PREFERRED EMBODIMENTS

Figure 5:
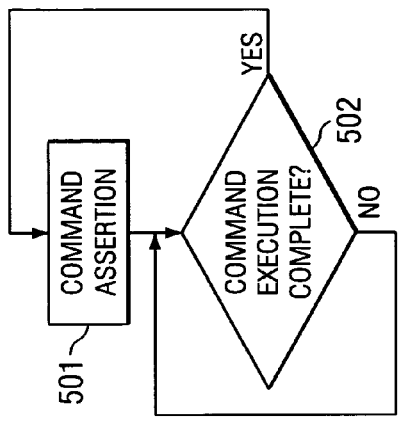
FIG. 5 illustrates a flow chart of host processor operation according to the prior art.

FIG. 1 illustrates a consumer DVD/HDD hybrid recording system, the type system to which the invention is applicable. The heart of the system is MPEG codec LSI (large scale integrated circuit) 100. MPEG codec LSI 100 receives an input from a television signal source such as antenna 110 and receiver 115 for capturing a broadcast signal. MPEG encoder 120 encodes this input signal. The encoded signal is temporarily stored in track buffer 131. In the example illustrated in FIG. 1, track buffer 131 serves as a write buffer for first storage device 141. The example of FIG. 1 illustrates reading second storage device 145 with track buffer 135 serving as a read buffer. The read data, which has been previously MPEG encoded is decoded by MPEG decoder 140. The decoded signal is displayed via display 150. In the typical consumer DVD/HDD hybrid recording system, first storage device 141 is a read/write magnetic fixed memory drive (HDD) and second storage device 147 is a read/write optical disk drive (DVD)

FIG. 2 illustrates a block diagram view of a system to which this invention is applicable. Host processor 201 exchanges driver and interrupt signals with interface hardware 210. Interface hardware 210 exchanges handshake protocol signals 215 with external drive 220. External drive 220 could be either first storage device 141 or second storage device 147.

Especially in consumer video and audio recorder systems with plural storage devices such as the DVD/HDD hybrid recorder illustrated in FIG. 1, the interface hardware 210 automatically carries out the handshake protocols 215 with the external storage device 220 during a command execution. Host processor 201 specifies the command execution for the interface hardware 210.

FIG. 3 illustrates normal command execution. Reference number 300 is the time line of host processor 201 operation. Reference 310 is the time line of interface hardware 210 operation. Reference 320 is the time line of external device 220 operation. Before time t1, host processor 201 prepares interface hardware 210 for command execution. Host processor 201 transmits GO flag 301 to interface hardware 210 to start command execution. During the time between t1 and t2, interface hardware 210 exchanges protocol signals 302 with external device 220. Command execution finishes at time t2 following the time 303 of command execution. Handshake protocol 302 stops and interface hardware 210 asserts an interrupt flag 304 (Done signal) to host processor 201. Interrupt flag 304 indicates that command execution is complete. After time t2, interface hardware 210 and external device 220 are idle in preparation for the next command.

Figure 4:
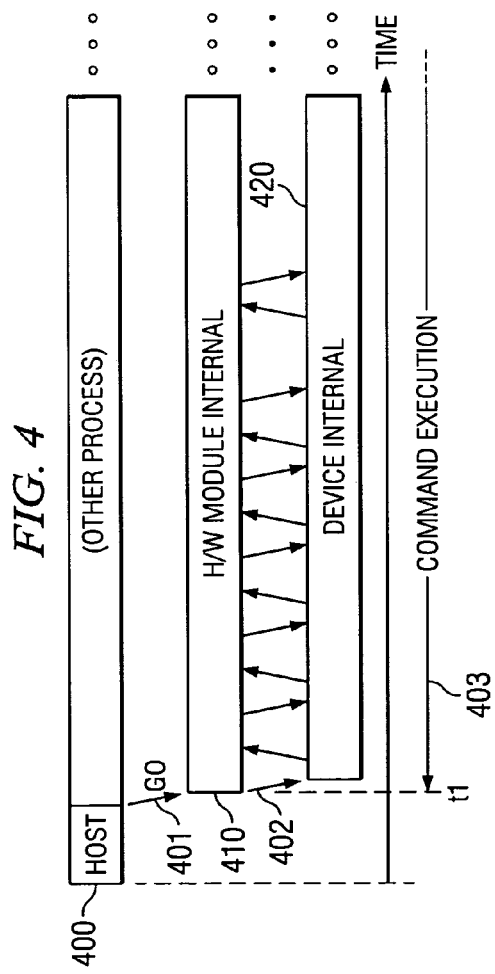
FIG. 4 illustrates the control sequence for the external device during a fault according to the prior art.

FIG. 4 illustrates the case of an external device 220 fault. Reference number 400 is the time line of host processor operation. Reference 410 is the time line of interface hardware 210 operation. Reference 420 is the time line of external device 220 operation. Before time t1, host processor 201 prepares interface hardware 210 for command execution. Host processor 201 transmits GO flag 401 to interface hardware 210 to start command execution. During the time between t1, and t1, interface hardware 210 exchanges protocol signals 402 with external device 220. In this case command execution continues due to a device fault and interface hardware 210 never generates the interrupt flag. Interface hardware 210 and external device 220 continue handshake protocols 402 and are not prepared for the next command execution. This case may occur when the external storage device 220 fails to access the media due to a fatal defect of the media. Once this occurs, it takes 10 to 20 seconds for a prior art system to finish the command execution in worst case. Interface hardware 210 in prior art has no capability to abort command execution. This is because of the low occurrence of such faults. This functionality is generally omitted from a low cost system. Considering the real time system characteristics, this amount of time for execution of one command may cause system breakdown. This may occur even if host processor 201 has a large buffer memory that can store the amount of data corresponding to the command execution time. This invention is proposed to avoid such a breakdown.

FIG. 5 illustrates a flow chart of the processes on host processor 201. Following command assertion (processing block 501), host processor 201 tests for completion of command execution (decision block 502). This occurs while interface hardware 201 controls external device 220. If the command completes (yes at decision block 502), then host processor 201 asserts the next command (processing block 501). If the command does not complete (no at decision block 502), then host processor 201 continues to test for command completion (decision block 502). Thus host processor 201 remains in a loop upon a device fault preventing command completion.

In this invention, control of the external device 220 is moved from interface hardware 210 to host processor 201 if command execution doesn't finish before a time limit set by host processor 201. Handshake protocols between interface hardware 210 and external device 220 is automatic during normal command execution. If command execution doesn't complete within the time limit, control of external device 220 moves to host processor 201. Thus, host processor 201 controls the handshake protocols with external device 220 directly and sequentially.

Figure 6:
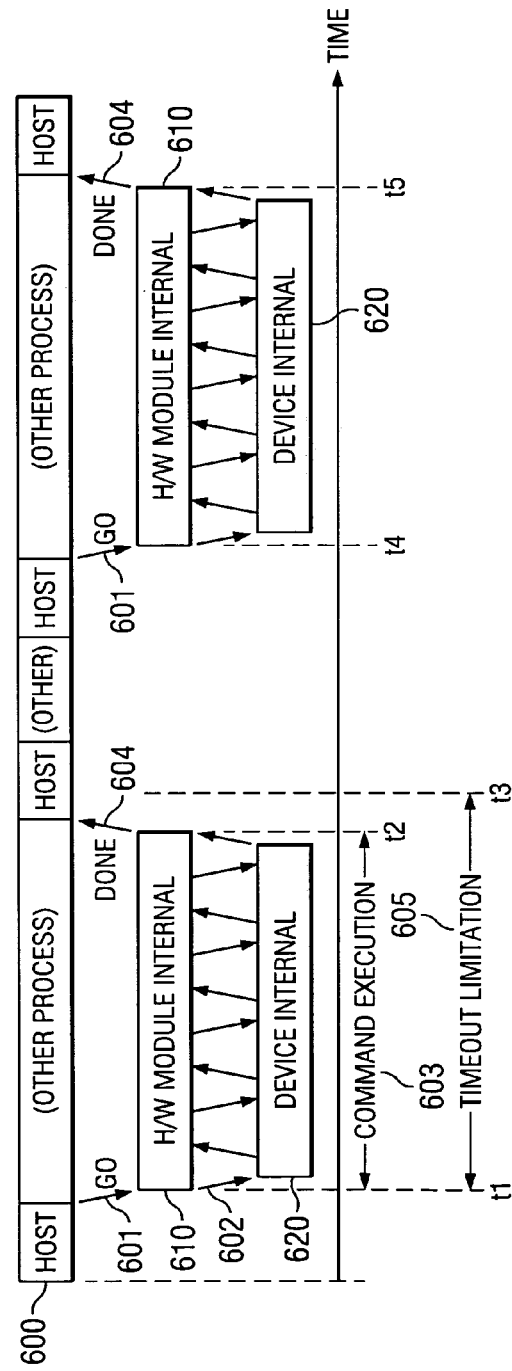
FIG. 6 illustrates the control sequence for the external device during normal operation according to this invention.

FIG. 6 illustrates operation of this invention in the normal case. Reference number 600 is the time line of host processor 201 operation. Reference 610 is the time line of interface hardware 210 operation. Reference 620 is the time line of external device 220 operation. Before time t1, host processor 201 prepares interface hardware 210 for command execution. Host processor 201 transmits GO flag 601 to interface hardware 210 to start command execution. During the time between t1 and t2, interface hardware 210 exchanges protocol signals 602 with external device 220. Command execution finishes at time t2 following the time 603 of command execution. Handshake protocol 602 stops and interface hardware 210 asserts an interrupt flag 604 (Done signal) to host processor 201. Interrupt flag 604 indicates that command execution is complete. After time t2, interface hardware 210 and external device 220 are idle in preparation for the next command. In this example, command completion and generation of done signal 604 occurs before the end of the timeout limitation 605 at t3. FIG. 6 illustrates a second normal sequence beginning at time t4 and ending at time t5.

Figure 7:
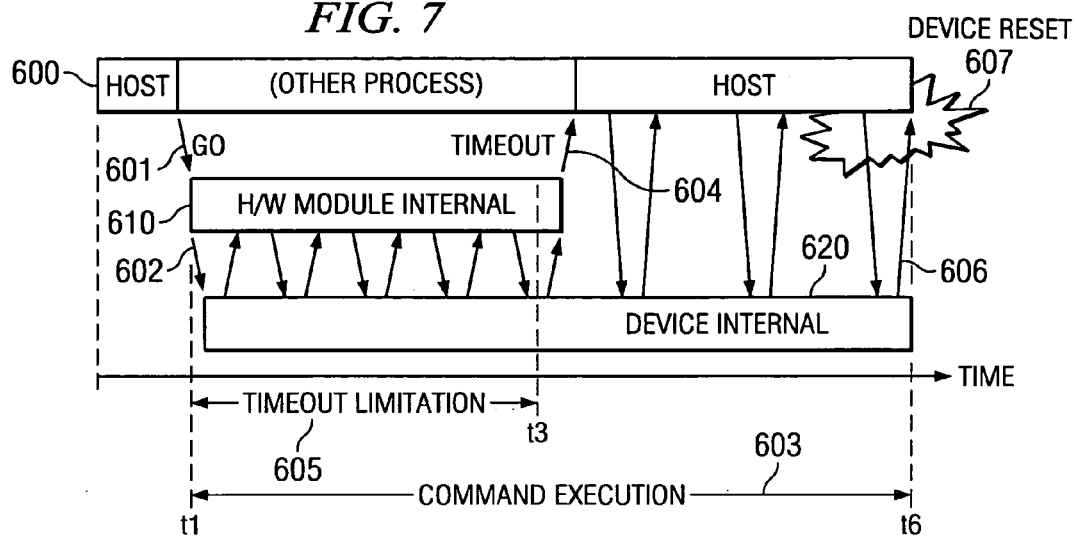
FIG. 7 illustrates the control sequence for the external device during a fault according to this invention.

FIG. 7 illustrates operation of this invention in the abnormal case. Before time t1, host processor 201 prepares interface hardware 210 for command execution. Host processor 201 transmits GO flag 601 to interface hardware 210 to start command execution. During the time between t1 and t3, interface hardware 210 exchanges protocol signals 602 with external device 220. If command execution does not finish before the end of the timeout limitation 605 at time t3, interface hardware 210 asserts a time out interrupt flag 604 to host processor 201. This includes a status flag that indicates the asserted command is to be continued without any error. Thereafter interface hardware 210 stops further handshake protocols with external device 220.

Control of external device 220 is moved to host processor 201. Command execution continues with host processor 201 controlling further handshake protocols 606 by direct and sequential control of interface hardware 210 and external device 220. Host processor 201 controls each such handshake. This continues until the command completes or an additional time expires. At time t6 and the end of this additional time host processor 201 causes command execution to terminate. In this example, this termination takes place via device reset signal 607.

In a consumer DVD recorder a typical command execution time is one second. The time limit should be set more than this time interval. A time limit of 3 seconds is suitable for consumer DVD recorder applications. This time limit may be predetermined upon manufacture and permanently set in interface hardware 210. Alternatively, the time limit may be set by host processor 201 writing data into a register reserved for this purpose in interface hardware 210.

Figure 8:
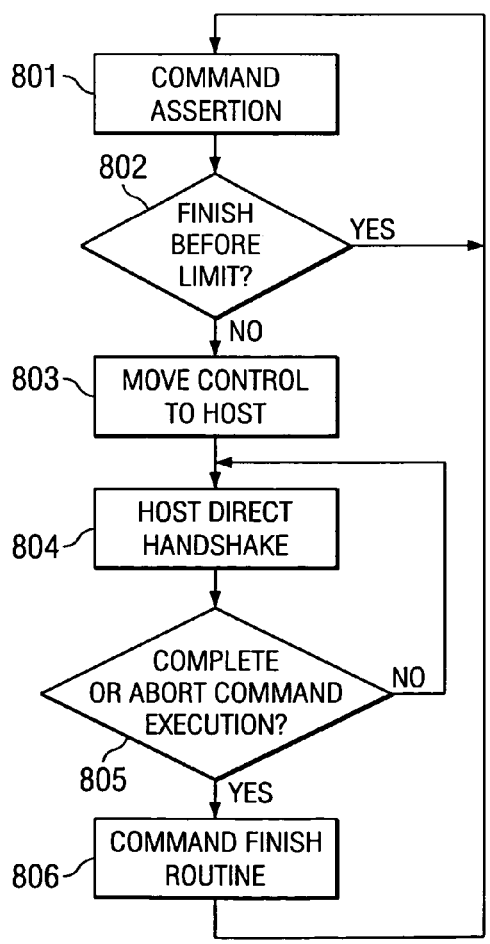
FIG. 8 illustrates a flow chart of host processor operation according to this invention.

FIG. 8 illustrates a flow chart of the processes on host processor 201. Following command assertion (processing block 801), host processor 201 tests for completion of command execution (decision block 502). This occurs while interface hardware 201 controls external device 220. If the command completes within the time limit (yes at decision block 802), then host processor 201 asserts the next command (processing block 801). If the command does not complete within the time limit (no at decision block 802), then host processor 201 takes control of the handshake protocol with external device 220 (processing blocks 803 and 804). Host processor 201 tests to determine if the command completes or aborts (decision block 805). If neither event occurs (no at decision block 805), then host processor 201 continues to direct the handshake protocol (processing block 804). If the command completes or aborts (yes at decision block 805), then host processor 201 executes a command finish routine (processing block 806). Control returns to processing block 801 for the next command.

This invention is effective in real-time systems such as video and audio recording systems with storage devices. Using this invention, the host processor can actively control the external storage device by specifying a time limit for command execution.

What is claimed is:

1. In a system including a host processor, interface hardware and an external device, a method of real-time control of the external device comprising the steps of:
   beginning operation of the external device upon a command assertion by the host processor;
   controlling the external device by handshake protocol with the interface hardware until completion of the command or expiration of a predetermined time; and
   controlling the external device by handshake protocol with the host processor upon expiration of the predetermined time without command completion.

2. The method of claim 1, further comprising the step of:
   specifying the predetermined time by the host processor.

3. The method of claim 1, wherein:
   said predetermined time is longer than an expected time for command execution.

4. The method of claim 1, wherein:
   the external device is a DVD optical disk drive.

5. The method of claim 4, wherein:
   the system is a real time video recording system.

* * * * *